United States Patent
Gino et al.

(10) Patent No.: US 10,999,413 B1
(45) Date of Patent: May 4, 2021

(54) PUBLIC AND PRIVATE API HUB SYNCHRONIZATION

(71) Applicant: R SOFTWARE INC., San Francisco, CA (US)

(72) Inventors: Iddo Gino, San Francisco, CA (US); Andrey Bukati, San Francisco, CA (US); Srivatsan Srinivasan, San Franciso, CA (US)

(73) Assignee: R SOFTWARE INC., San Francisco, CA (US)

( * ) Notice: Subject to any disclaimer, the term of this patent is extended or adjusted under 35 U.S.C. 154(b) by 0 days.

(21) Appl. No.: 16/879,783

(22) Filed: May 21, 2020

(51) Int. Cl.
*H04L 29/06* (2006.01)
*H04L 12/26* (2006.01)
*H04L 29/08* (2006.01)

(52) U.S. Cl.
CPC .......... *H04L 67/40* (2013.01); *H04L 43/0811* (2013.01); *H04L 67/025* (2013.01); *H04L 67/2804* (2013.01); *H04L 67/42* (2013.01)

(58) Field of Classification Search
CPC ..... H04L 67/40; H04L 67/2804; H04L 67/42; H04L 67/025; H04L 43/0811
See application file for complete search history.

(56) References Cited

U.S. PATENT DOCUMENTS

| | | | |
|---|---|---|---|
| 7,433,835 | B2 | 10/2008 | Frederick et al. |
| 9,553,787 | B1 | 1/2017 | Stickle et al. |
| 2009/0235283 | A1* | 9/2009 | Kim ........................ H04L 67/10 719/328 |
| 2013/0132584 | A1 | 5/2013 | Palladino et al. |
| 2015/0363493 | A1 | 12/2015 | Laredo et al. |
| 2016/0239546 | A1 | 8/2016 | Cuomo et al. |
| 2016/0267153 | A1 | 9/2016 | Witkop et al. |
| 2016/0292018 | A1 | 10/2016 | Laredo et al. |
| 2016/0294667 | A1 | 10/2016 | Prabhakar et al. |
| 2018/0004585 | A1 | 1/2018 | Aguilar Mares et al. |
| 2018/0232444 | A1 | 8/2018 | Duesterwald et al. |
| 2019/0149425 | A1 | 5/2019 | Larish et al. |
| 2019/0349382 | A1* | 11/2019 | Thomas .......... H04N 21/47202 |
| 2020/0159597 | A1 | 5/2020 | Gino et al. |

(Continued)

OTHER PUBLICATIONS

U.S. Appl. No. 16/432,957 office action dated Mar. 5, 2020.

(Continued)

*Primary Examiner* — Kim T Nguyen
(74) *Attorney, Agent, or Firm* — Kligler & Associates Patent Attorneys Ltd (57) ABSTRACT

A method, including receiving, by a first API hub server in communication with a set of private APIs and with a second API hub server that is in communication with a set of public APIs, metadata for the APIs, each of the APIs including one or more respective API calls. A request is received from a client computer to access a given endpoint of a given API, and using the metadata for the given API, an API call is generated. Upon determining that the given API includes a given private API the generated API call is conveyed to the given private API, and upon determining that the given API call includes a given public API, the generated API call is conveyed to the second API hub server. Finally, upon receiving a response to the conveyed API call, the response is forwarded to the client computer.

19 Claims, 5 Drawing Sheets

(56) References Cited

U.S. PATENT DOCUMENTS

2020/0159731 A1     5/2020   Gino et al.
2020/0334304 A1*   10/2020   Reddy Vennapusa ..................
                                                                                       G06F 16/2379

OTHER PUBLICATIONS

Mou et al., "Interactive Web Service Choice-Making Based on Extended QoS Model", Journal of Zhejiang University—Science A, vol. 7, pp. 483-492, Mar. 2006.

Bianchini et al., "Model-Based Search and Ranking of Web APIs across Multiple Repositories", 15th international conference Web information systems engineering—WISE 2014, pp. 218-233, year 2014.

The GraphQL Foundation, "A query language for your API", pp. 1-7, Feb. 16, 2018.

* cited by examiner

PUBLIC AND PRIVATE API HUB SYNCHRONIZATION

FIELD OF THE INVENTION

The present invention relates generally to application programming interfaces (APIs), and particularly to synchronizing a private API hub server with a public API hub server in order to manage calls to public and private APIs, and enabling independent management of users on each of the hub servers and independent and/or separate billing on each of the hub servers.

BACKGROUND OF THE INVENTION

In computer programming, an application programming interface (API) is a set of building blocks that programmers can use to develop software applications. APIs enable two pieces of software to communicate by enabling one application to plug directly into the data and services of another application.

Types of APIs include private APIs and public APIs. A private API is an API that has its application hosted with in-house developers. Private APIs act as front end interfaces to back end data and application functions. A public API (also known as an open API) is a publicly available API that provides developers with programmatic access to a proprietary software application or web service.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including receiving, by a first application program interface (API) hub server in communication with a set of private APIs and with a second API hub server that is in communication with a set of public APIs, metadata for the APIs, each of the APIs including one or more respective API calls, receiving, from a client computer, a request to access a given endpoint of a given API, generating, using the metadata for the given API, an API call, upon determining that the given API includes a given private API, conveying the generated API call to the given private API, upon determining that the given API call includes a given public API, conveying the generated API call to the second API hub server, and upon receiving a response to the conveyed API call, forwarding the response to the client computer.

In one embodiment, the method also includes computing, by the first API hub server, performance metrics for the given API call and response.

In an additional embodiment, the method also includes conveying the computed performance metrics to the second API hub server.

In a further embodiment, the method also includes receiving, by the first API hub server from the client computer, a request for performance metrics for one or more of the APIs, forwarding the request to the second API hub server, receiving a response to the performance metrics request, and forwarding, to the client computer, the response to the performance metrics request.

In another embodiment, the first API hub server stores, in a memory, initial performance metrics, and the method also includes updating, in the memory, the initial performance metrics with the computed performance metrics.

In a supplemental embodiment, the method also includes conveying the computed performance metrics to the second API server upon determining that the given API call includes a given public API.

In an additional embodiment, the method also includes receiving, by the first API hub server from the client computer, a request for performance metrics for one or more of the APIs, retrieving the requested performance metrics from the memory, and forwarding, to the client computer, the retrieved performance metrics.

In another embodiment, a given performance metric for the given API includes usage information for the given API.

In a further embodiment, receiving the metadata for the APIs includes the metadata for the set of the public APIs and the set of the private APIs.

In a supplemental embodiment, receiving the metadata for the APIs includes receiving the metadata for a subset of the public APIs.

There is also provided, in accordance with an embodiment of the present invention, an apparatus including a first application program interface (API) hub server in communication with a set of private APIs and with a second API hub server that is in communication with a set of public APIs, the first API hub server including a memory, and at least one processor configured to receive metadata for the APIs, each of the APIs including one or more respective API calls, to store the received API metadata to the memory, to receive, from a client computer, a request to access a given endpoint of a given API, to generate, using the metadata for the given API, an API call, upon determining that the given API includes a given private API, to convey the generated API call to the given private API, upon determining that the given API call includes a given public API, to convey the generated API call to the second API hub server, and upon receiving a response to the conveyed API call, to forward the response to the client computer.

There is additionally provided, in accordance with an embodiment of the present invention, a computer software product, the product including a non-transitory computer-readable medium, in which program instructions are stored, which instructions, when read by a by an first application program interface (API) hub server in communication with a set of private application program interfaces (APIs) and with a second API hub server that is in communication with a set of public APIs, cause the first API hub server to receive metadata for the APIs, each of the APIs including one or more respective API calls, to receive, from a client computer, a request to access a given endpoint of a given API, to generate, using the metadata for the given API, an API call, upon determining that the given API includes a given private API, to convey the generated API call to the given private API, upon determining that the given API call includes a given public API, to convey the generated API call to the second API hub server, and upon receiving a response to the conveyed API call, to forward the response to the client computer.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Enterprise software systems typically utilize several public and/or private application programming interfaces (APIs). These APIs may be grouped by user access privileges or by their respective developers (i.e., the creators/providers of the APIs).

Embodiments of the present invention provide methods and systems for synchronizing a first API hub server to synchronize with a second API hub server in order to manage requests for API calls. As described hereinbelow, the first API hub server is in communication with a set of private APIs and with the second API hub server that is in communication with a set of public APIs, each of the APIs comprising one or more respective API calls, and the first API hub server is initialized by receiving metadata for each of the APIs.

Once initialized, the first API hub server receives, from a client computer, a request to access a given endpoint of a given API, and uses the metadata for the given API to generate an API call. Upon determining that the given API comprises a given private API, generated API call is conveyed to the given private API, and upon determining that the given API call comprises a given public API, the generated API call is conveyed to the second API hub server. Finally, upon receiving a response to the conveyed API call, the response is forwarded to the client computer.

Private APIs (also known as internal APIs) can be created and published by employees within an organization. Typically, only an authorized subset of the organization's employees can view or access the private APIs. However, there may be exceptions to this rule. In a first exception example, private APIs that are shared with select external individuals, teams or organizations are known as partner APIs. In a second exception example, private APIs that are accessible to any developer to find/test/use online are known as externalized APIs (i.e., published public APIs). In a third exception example, APIs published by individuals or organizations external to the enterprise (and may or may not be accessible to the general public) are known as consumed external APIs (and are also known as third party public or partner APIs).

Systems implementing embodiments of the present invention can provide a single enterprise API hub platform for managing discovery, testing, evaluation and comparison, access control, integration, and monitoring of internal, partner, externalized, and consumed external APIs.

System Description

Figure 1:
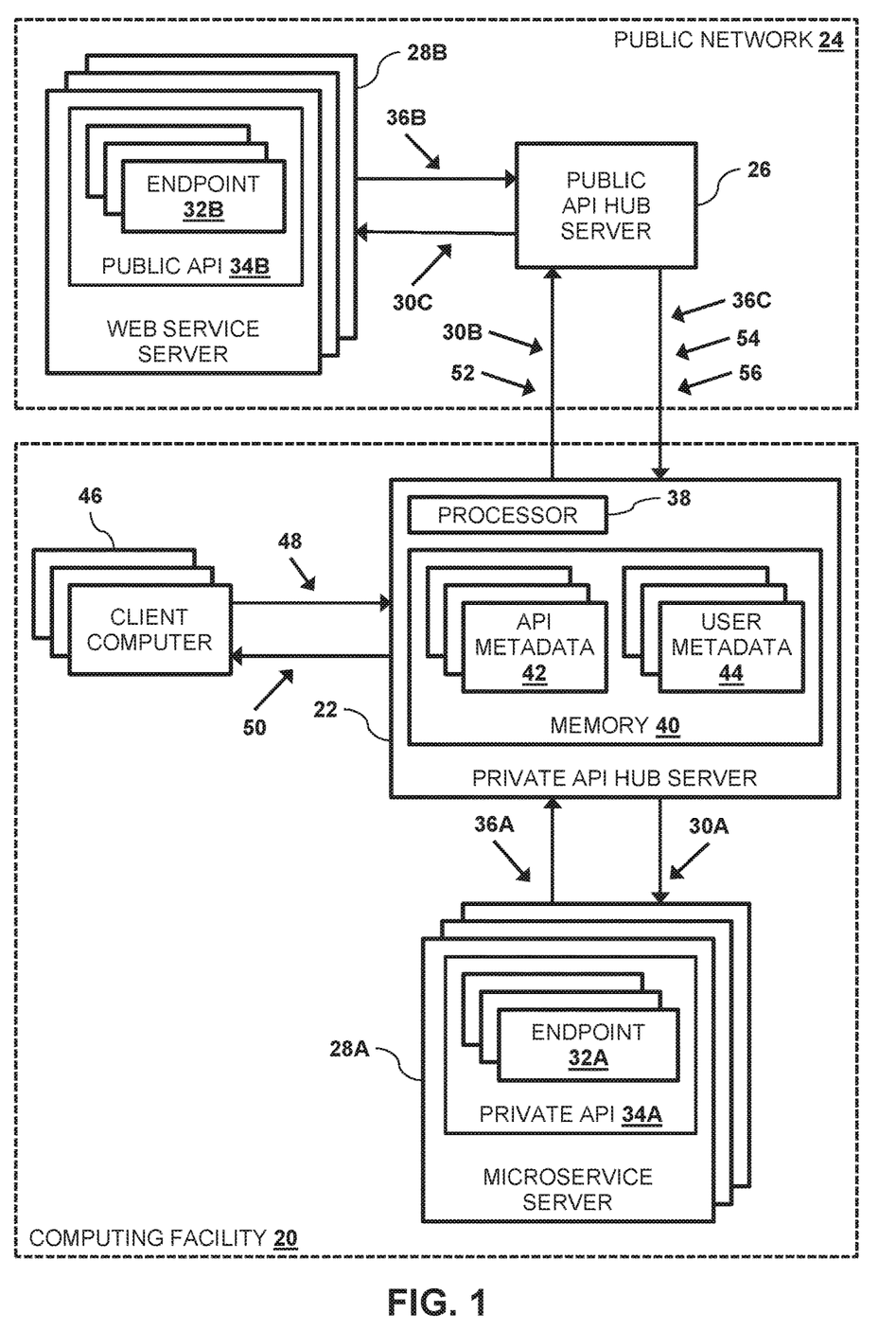
FIG. 1 is a block diagram that schematically shows a computing facility comprising a private application programming interface (API) hub server that synchronizes with a public API hub server in order to manage API calls to public and private APIs, in accordance with an embodiment of the present invention.

FIG. 1 is a block diagram that schematically shows a computing facility 20 comprising a private API hub server 22 (also referred to herein as a first API hub server), and a public network 24 (e.g., the Internet) comprising a public API hub server 26 (also referred to herein as a second API hub server), in accordance with an embodiment of the present invention. In embodiments described herein, private API hub server 22 is configured to communicate with public API hub server 26 and one or more servers 28.

In embodiments of the present invention, private API hub server 22 synchronizes with public API hub server 26 so as to manage API calls 30 to respective endpoints 32 of APIs 34 hosted by servers 28, and to manage API responses 36 received in response to the API calls. While the configuration in FIG. 1 shows each server 28 hosting a single API 34, any given server 28 hosting more than one API 34 is considered to be within the spirit and scope of the present invention.

In examples described herein, API hub servers 22 and 26 execute the RapidAPI™ platform produced by R Software Inc. (San Francisco, Calif., U.S.A.).

Servers 28 can be configured to provide software services such as microservices and web services. Microservices typically comprise independently deployable and scalable software services that communicate over a network. Web services are typically software applications that make themselves available over public network 24 (e.g., the Internet) and use a standardized Extensible Markup Language (XML) messaging system.

In FIG. 1, servers 28 and their respective APIs 34 and endpoints 32 are differentiated by appending a letter to the identifying numeral, so that the servers comprise microservice servers 28A in computing facility 20 and web service servers 28B on public network 24, and the APIs comprise a set of private APIs 34A and a set of public APIs 34B. In some embodiments, each server 28A comprising respective private APIs 34A and private API endpoints 32A, and each server 28B comprising respective public APIs 34B and API endpoints 32B.

In a similar manner, API calls 30 and API responses 36 are differentiated in FIG. 1 by appending a letter to the identifying numeral, so that the API calls comprise API calls 30A-30C and the API responses comprise API responses 36A-36C. In embodiments described herein, call 30A (also referred to herein as private API call 30A) is for a given endpoint 32A of a given private API 34, and calls 30B and 30C (also referred to herein as public API call 30B and 30C) are for a given endpoint 32B of a given public API 34. Likewise, response 36A (also referred to herein as private API response 36A) is from a given private API 34, and responses 30B and 30C (also referred to herein as public API responses 30B and 30C) are from a given public API 34.

In some embodiments, servers 28B can be configured to provide (i.e., via APIs 34B) web services, which can be applications or data sources that are accessible via a standard web protocol (HTTP or HTTPS). Examples of web services include, but are not limited to, sending an SMS, providing information about the current weather, or sending an email.

Private API hub server 22 comprises a processor 38 and a memory 40 that can store API metadata records 42 and user metadata records 44. API metadata records 42 and user metadata records 44 are respectively described in the descriptions referencing FIGS. 2 and 3 hereinbelow.

In addition to private API hub 22 and one or more servers 34A, computing facility 20 may comprise a plurality of client computers 46.

In embodiments described herein, upon processor 38 receiving, from a given client computer 46, an API hub request 48 for a given API call 30, the processor determines if the given API call is for a given private API 34A or if the given API call is for a given public API 34B. If processor 38 determines that the given API call is for a given private API 34A, then the processor generates private API call 30A in response to receiving request 48, and conveys the generated private API call to the given private API. Upon processor 38 receiving private API response 36A from the give private API in response to the conveyed private API request, the processor forwards the private API response to the given client computer in API hub response 50.

On the other hand, if processor 38 determines that the given API call is for a given public API 34B, then the processor generates public API call 30B in response to receiving request 48, and conveys the generated public API call to public API hub server 26. In response to receiving public API call 30B, public API hub server 26 forwards the received public API call to the given public API in public API call 30C. Upon public API server 26 receiving public API response 36B from the given public API, the public API server forwards the received pubic API response to private API hub server 22 in public API response 36C. Upon private API hub server 22 receiving public API response 36, the private API server conveys the received public API response to the given client computer in API hub response 50.

In some embodiments, processor 38 can initialize private API hub server 22 by conveying a metadata request 52 to public API hub server 26. In response to receiving metadata request 52, public API hub server 26 conveys API metadata 54 and user metadata 56 to private API hub server 22. Upon receiving metadata 54 and 56, processor 38 stores information the API metadata to records 42 as described in the descriptions referencing FIGS. 4 and 5 hereinbelow.

Processor 38 comprises one or more general-purpose central processing units (CPUs) or one or more special-purpose embedded processors, which can be programmed in software or firmware to carry out the functions described herein. This software may be downloaded to private API hub 22 in electronic form, over a network, for example. Additionally or alternatively, the software may be stored on tangible, non-transitory computer-readable media, such as optical, magnetic, or electronic memory media. Further additionally or alternatively, at least some of the functions of processor 38 may be carried out by hard-wired or programmable digital logic circuits.

Examples of memory 40 include dynamic random-access memories and non-volatile random-access memories. Additionally or alternatively, the memories may comprise non-volatile storage devices such as hard disk drives and solid-state disk drives.

In embodiments described herein, API hub servers 22 and 26 are each configured to provide, to client computers 46, API marketplace and API gateway services. In these embodiments, private API hub server 22 provides a private API marketplace and a private API gateway, and public API server 26 provides a public API marketplace and a pubic API gateway.

In an alternative embodiment, the private API marketplace and the private gateway services may execute on separate servers. Likewise, the public API marketplace and the public gateway services may execute on separate servers The API marketplaces can compute analytic information for the APIs (as described herein), and provide a user interface that enables users to discover (i.e., search, browse, read documentation) and test APIs 34 to which they have access. The API gateways can proxy API hub requests 48 and API responses 36 between the marketplaces and servers 28 comprising APIs 34.

In some embodiments, the functionality of API private hub server 22 may be deployed in a data cloud and/or as one or more physical and/or virtual computers in one or more computing facilities such as computing facility 20. In another embodiment, the local API hub server and one or more of servers 28A may comprise a single virtual machine or a single physical computer. Likewise, the functionality of API public API hub server 26 may be deployed in a data cloud and/or as one or more physical and/or virtual computers.

Figure 2:
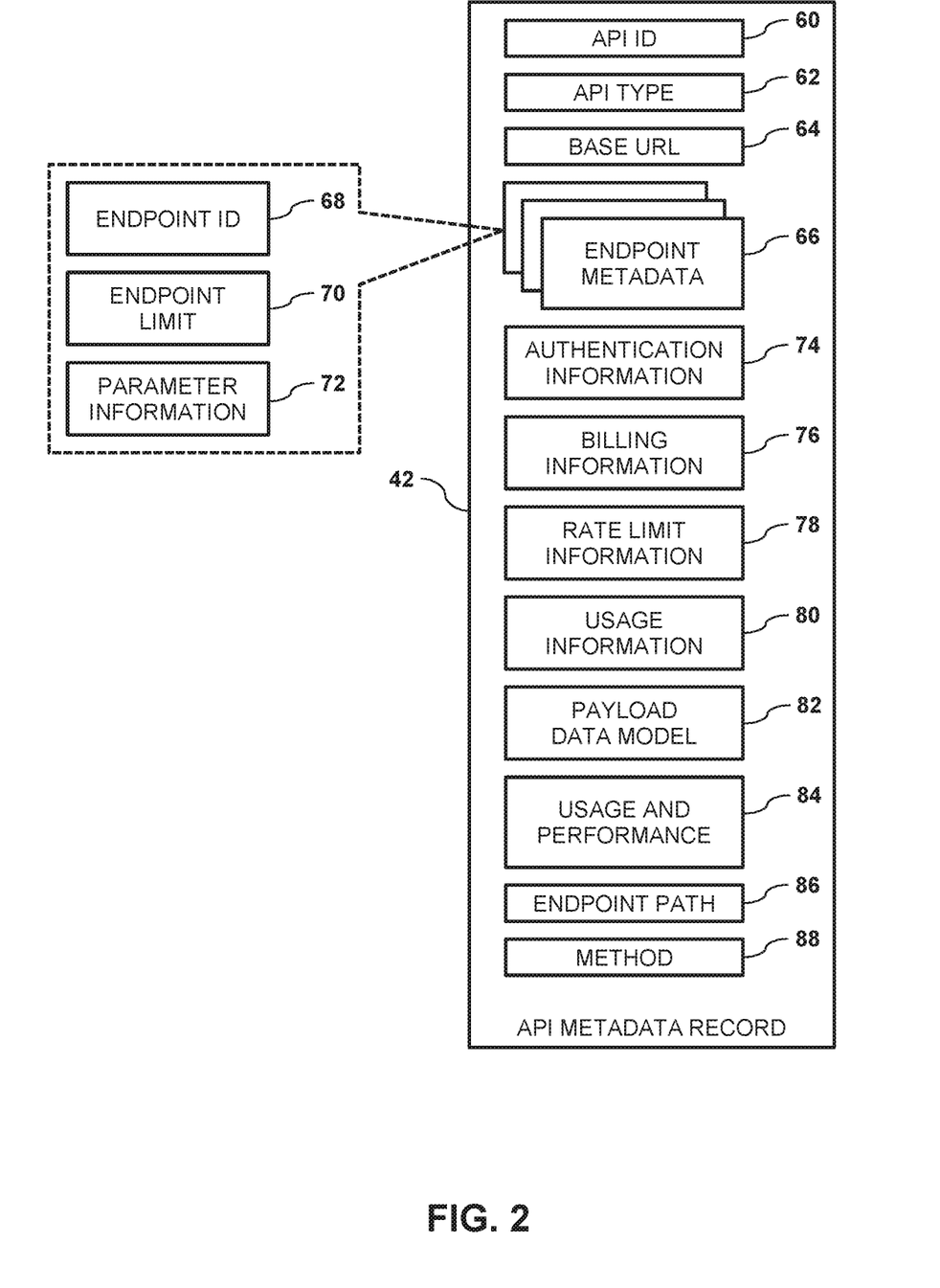
FIG. 2 is a block diagram showing examples of API call metadata stored by the local API hub server, in accordance with an embodiment of the present invention.

FIG. 2 is a block diagram showing a configuration of a given API metadata record 42, in accordance with an embodiment of the present invention. In some embodiments, API metadata records 42 have a one-to-one correspondence with APIs 32, and in the example shown in FIG. 2, each API metadata record 42 for a given (i.e., its corresponding) API 34 stores information such as:

An API identifier (ID) 60. API ID 16 is a unique identifier (e.g., a text string) for the given API.

An API type 62. The API type indicates if the given API is a private API or a public API.

A base Uniform Resource Locator (URL) 64 for the given API.

One or more endpoint metadata records 66. Each record 66 corresponds to a given endpoint 32 in the given API and stores information such as an endpoint ID 68 (e.g., a text string) that identifies the given endpoint, an endpoint limit 70 that specifies a limit of calls to the given endpoint during a specified time period (e.g., 25 calls per second), and one or more parameters 72 for a given API call 30 that accesses the given endpoint.

Authentication information 74. Examples of authentication information 74 include, but are not limited to:
   A RapidAPI™ key (i.e., by itself with no additional authentication information).
   A RapidAPI™ key and additional authentication information such as a header (e.g., and authorization header for a bearer token), a query or body parameter, an Oauth2 (an industry-standard protocol for authorization) configuration (e.g., a token URL, an authorization URL, and available scopes).

Billing information 76. Examples of billing information include, but are not limited to:
   A cost for the given API call.
   A cost per object. In some embodiments, an object comprises a set of endpoints 32 that share the same cost as the given API call.
   Pricing plan information. This information comprises all available pricing plans for the given API.
   An available quota. The quota can be for a given pricing plan or for a given object.

Rate limit information 78 comprising information included in the pricing plan for the given API.

Usage information 80 comprising a number of times the given API was called during a specified time period (e.g., a day, a week or a month)

A payload data model 82 comprising a schema for the body of a given API call 30 to the given API as illustrated in the following example:

```
{
    "type": "object",
    "properties": {
        "id": {
            "type": "string"
        },
        "name": {
            "type": "string"
        }
    }
}
```

Computed usage and performance metrics 84. Examples of metrics 84 that processor 38 can compute for the given API include, but are not limited to:
  Usage information (i.e., volume) of API calls 30 to the given API and to each given endpoint 32. In addition to using the usage information for performance metrics, processor 38 can use the usage information for accounting/billing purposes.
  An average response time (i.e., the time between transmitting a given API call 30 to the given API and receiving a response to the given API call).
  A set of client status codes. In one embodiment, the client status codes may comprise 4xx errors that are generated by a given server 28 that hosts the given API and indicate any errors in the API calls to the given API. In another embodiment, processor 38 can generate a given 4xx error (or any other client status code) upon analyzing a given API hub request 48 from a given client computer 46 and detecting an error (e.g., an incorrect parameter) in the given API hub request.
  A set of server status codes, such as any errors (e.g., 5xx errors) on a given 28 server that processed API calls 30 for the given API.
  A set of precision metrics. In a first example, if the given API is for a software application that performs facial recognition, the precision metrics may include a confidence score and an accuracy measure (e.g., was the result of a facial recognition API request correct?). In a second example, if the given API is for stock quotes, a given precision metric may comprise a recency of a given stock quote. In a third example, if a given API call 30 to the given API is for currency exchange rate, a given precision metric may comprise a recency of a given exchange rate. In a fourth example, if a given API call 30 to the given API is for a search engine that processes queries, a given precision metric may comprise a relevance score of a result of a given query. In a fifth example, if a given API call 30 to the given API is for user or company data, a given precision metric may comprise how many fields (e.g., email address, mailing address, website URL, Twitter link, GitHub link) are returned.
An endpoint path 86. A given endpoint path 86 for the given API comprises resources (e.g., "/users" or "/employees") that can be exposed by the given API. Typically, a given endpoint path 86 for the given API is relative to the given API's base URL (also known as a server path). In some embodiments, a full path for the given API comprises a given endpoint path 86 (i.e., for the given API) appended to the base URL (i.e., for the given API).
A method 88. A given method 88 for the given API comprises an operation that can used to manipulate a given resource (e.g., GET, PUT, POST, PATCH, DELETE etc.) in the given API.

Figure 3:
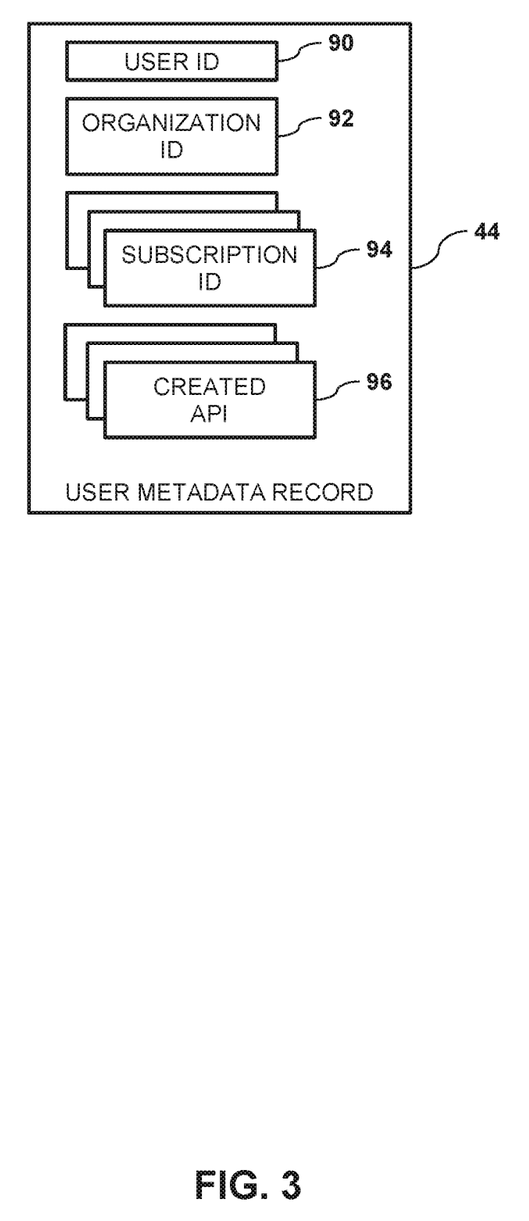
FIG. 3 is a block diagram showing examples of user metadata stored by the local API hub server, in accordance with an embodiment of the present invention.

FIG. 3 is a block diagram showing examples of user metadata records 44, in accordance with an embodiment of the present invention. In some embodiments, user metadata records 44 have a one-to-one correspondence with users (not shown) of client computers 46. For each given user, the corresponding metadata record can store information such as:
  A user ID 90 referencing the given user.
  An organization ID 92 referencing a specific organization (i.e., a company) and the given user indicated by a given user ID 90.
  One or more subscription IDs 94. Each subscription ID 94 references a given API 34, a given pricing plan (as described in the description referencing billing information 76 hereinabove) and a given user or a given organization subscribing to the given pricing plan. Processor 38 can use the subscription ID(s) for the given API to monitor usage of the given API.
  One or more created APIs 96. Each created API 96 referencing a given API 34 that was created by or is owned by the given user (or a given organization to which the given user belongs). Typically, users and organizations are not charged for using the APIs that they own.

In some embodiments, private API server 22 and/or public API server 24 can use information stored in user metadata records 44 to compute, for a given user (i.e., as referenced by a given user ID 90 a given organization ID 92), analytic information for API calls 30 by the given user to APIs 34, and to convey the computed analytic information to the user interface on a given client computer 46 operated by the given user.

In further embodiments, as described supra, API hub servers 22 and can 26 execute the RapidAPI™ platform produced by R Software Inc. (San Francisco, Calif., U.S.A.). In these embodiments, private API hub server 22 can receive the following API hub request 48 from a given client computer 46 (note that line numbers are included in the examples below for purposes of visual simplicity):
  1) import requests
  2) url="https://climacell-microweather-v1.p.rapidapi.com/weather/forecast/daily"
  3) querystring=("lon":"-122.43","lat":"37.7")
  4) payload=" "
  5) headers={'X-RapidAPI-Key': '<<User's RapidAPI App Key>>'}
  6) response=requests.request("GET", url, data=payload, headers=headers, params=querystring)
  7) print (response.text)

In this example, the API hub request is requesting a call to the ClimaCell API (produced by ClimaCell Inc., Boston, Mass., U.S.A.) to retrieve a daily weather forecast for a specified location. In this API hub request:
  Line 2 includes a text string for base URL 64. Regarding the text "climacell-microweather-v1.p.rapidapi.com":
    In one embodiment, this part of the URL can be configurable per server 22 or server 26. For example for a given user customer-X this part of the URL could be "https://customer-X.edu/climacell-microweather/forecast/daily".

In another embodiment, the API being called can be sent as another header.

In an additional embodiment, "rapidapi.com" in this URL can be replaced by "customer-X" or any other term for instance.

Line 3 includes parameters 72 comprising longitude and latitude values for a geographical location. In this example, the Querystring parameters comprise input parameters (i.e., latitude and longitude for the weather request), and X-RapidAPI-Key comprises the secret key for the user/team (i.e., for the given client computer) calling the API. Since this is a GET call, there is no payload.

Line 5 includes the headers sent in the API call. In this example, the headers comprise the user's secret key.

Line 6 puts together all the parameters in a call to the requests function of that library which makes the API call.

Line 7 prints the response received in response to the API call.

While this example of a given API hub request 48 uses Python and the Requests library, using other programming languages and other libraries to generate API hub requests 48 are considered to be within the spirit and scope of the present invention. For example, a given API hub request 48 may use Node.js and the Unirest library, Node.js and the Request library, Python and the Unirest library or PHP and the Unirest library.

In response to receiving the API hub request described supra, processor 38 generates and conveys the following API call 30B to private API hub server 22:

1) GET/weather/forecast/daily?lon=−122.43&lat=37.7 HTTP/1.1
2) Host: <<RapidAPI Public Cloud's base url provided to the private API hub>>
3) X-RapidAPI-Key: <<private API Hub's RapidAPI Key for subscriptions on the RapidAPI Public Cloud>>
4) X-RAPIDAPI-VERSION: <<Version Number>>
5) X-RAPIDAPI-GATEWAY-ID: <<private API Hub's identifier>>
6) + Additional headers and parameters to be included as defined by any transformations by the private API Hub API call 30B includes credentials identifying itself to the RapidAPI™ Public Cloud (i.e., public API hub server 26) for billing at the RapidAPI public cloud level. In line 3 of API call 30B, X-RapidAPI-Key references information such as:

A name of an associated software application executing on a given server 28. In this example for API call 30B, X-RapidAPI-Key is associated with a specific software application. Additionally, each user may develop/execute multiple software applications, wherein each of the software application has a corresponding key. This enables the user to track the respective usage of the software applications.

A given user ID 90 and/or a given organization ID 92.

Billing information 76 such as subscription information and available quota information.

In response to receiving API call 30B, public API hub server 26 modifies call 30B to generate API call 30C, and forwards the following API call 30C to a given server 28B (i.e., referenced by the base URL for the given API):

1) GET/weather/forecast/daily?lon=−122.43&lat=37.7 HTTP/1.1
2) Host: <<API Provider's (ClimaCell's) base url provided to RapidAPI>>
3) X-RAPIDAPI-VERSION: <<Version Number>>
4) X-RAPIDAPI-USER: <<Username of User>>
5) X-RAPIDAPI-PROXY-SECRET: <<API Provider's Secret Key>>
6) X-RAPIDAPI-SUBSCRIPTION: <<Pricing plan user is subscribed to>>
7) + Additional headers and parameters to be included as defined by API provider In response to receiving this API call, the given web service server processes the API call, and can convey, to public API server 26, the following API response 36B (i.e., an example), which forwards this API response to private API server 22:

Status Code: 200
Headers:
"content-length": "188"
"content-type": "application/json; charset=UTF-8"
"date": "Tue, 24 March 2020 03:07:15 GMT"
"connection": "Close"
Response Body:
{
 "lat":42.8237618
 "lon":−71.2216286
 "precipitation":{
  "value":4.7
  "units": "mm/hr"
 }
 "observation_time":{
 "value":"2020-03-24T03:07:15.153Z"
 }
}

Upon private API server 22 receiving the API response, the API response is forwarded to the given client computer (i.e., that generated the API hub request).

In some embodiments, public API hub server 22 can modify the received API response so as to generate API hub response 50. In one example, a given API hub server can add, to the received API response, headers such as usage and balances (e.g., x-ratelimit-realtime-&-forecast-limit and x-ratelimit-realtime-&-forecast-remaining), and RapidAPI™-specific headers (region, version etc.). In another example, a given API hub server can strip out, from the received API response, any custom billing related headers that the API's provider may include in the response. In a further example, a given API hub server can further modify the API response to strip out the billing and usage headers specific to the given API hub server, and insert any headers with values that are specific to the user/team calling the API on the given API hub server.

In the configuration shown in FIG. 1, in response to public API server 26 receiving API response 36B, the public API server forwards the received API response to private API server 22 in API response 36C. In embodiments where public API hub server modifies API response 36B, API response 36C comprises the modified API response. In these embodiments, private API hub server 22 can forward the modified API response in API hub response 50.

As described supra, private API hub server 22 is configured to manage API hub requests 48 comprising API calls 30 to private APIs 34A and public APIs 34B. To manage API hub requests 48 to private APIs 32A, processor 38 can generate API calls 30A (and forward API responses 36A) in a manner similar to the example described hereinabove, albeit without needing to use public API hub server as a proxy (i.e., the private API hub server can communicate directly with microservice servers 28A.

API Call Management

Figure 4:
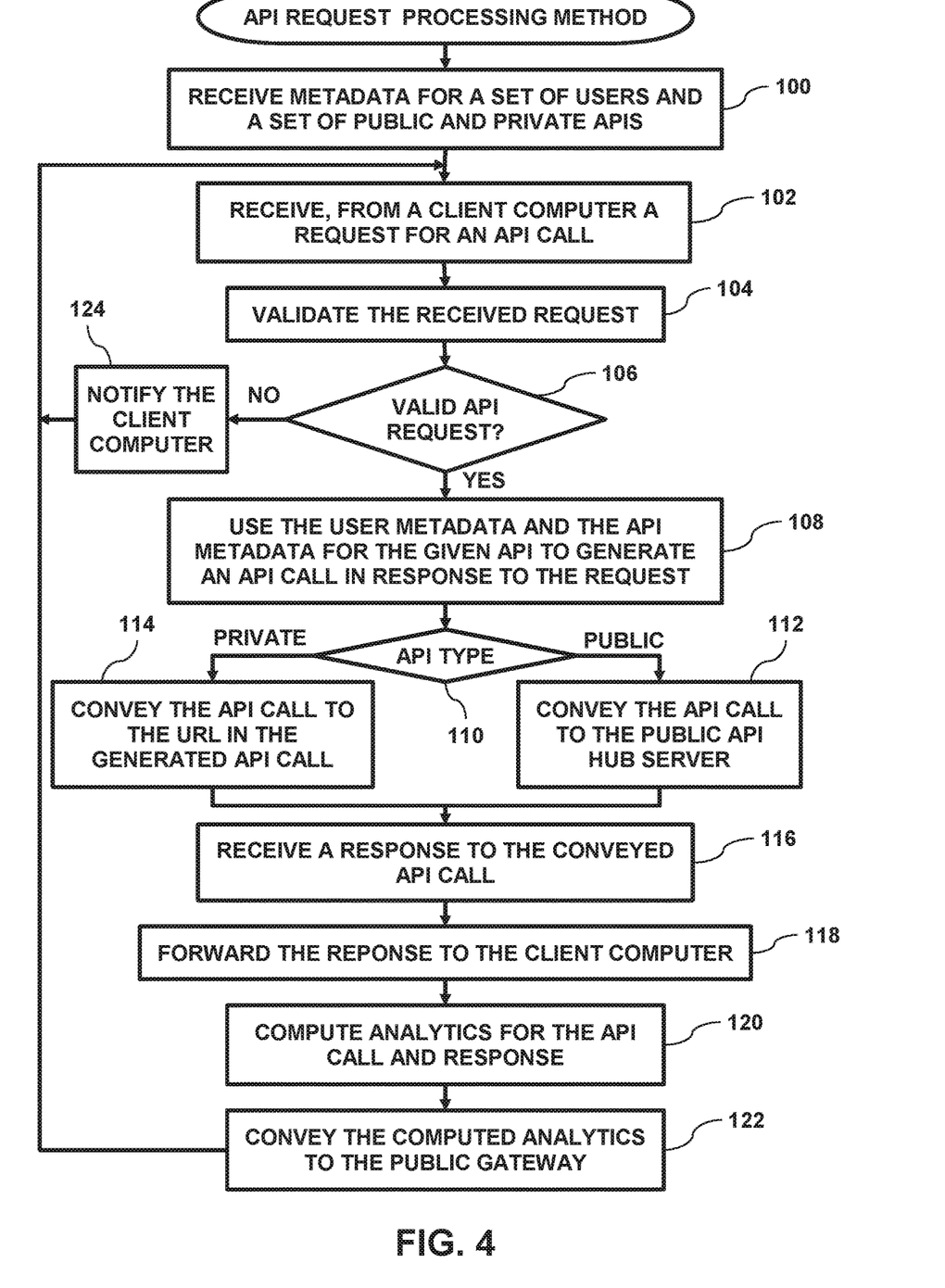
FIG. 4 is a flow diagram that schematically illustrates a first method for processing, by the private API hub server, requests for API calls to public and private APIs, in accordance with a first embodiment of the present invention.

FIG. 4 is a flow diagram that schematically illustrates a method for processing API hub requests 48, in accordance with a first request processing embodiment of the present invention. In step 100, processor 38 receives metadata 54 and 56 from public API hub server 26. In some embodiments, public API server 26 can convey metadata 54 and 56 to private API hub server 22 upon receiving metadata request 52 from the private API hub. In the first request processing embodiment, processor 38 can receive the API metadata for all public APIs 34B managed by public API hub server 26.

Upon receiving metadata 54 and 56, processor 38 populates API metadata records 42 with the information from API metadata 54, and populates user metadata records 44 with information from user metadata 56. In the first request processing embodiment, the received API metadata 54 (i.e., in step 100) comprises metadata for both the set of public APIs 34B and the set of private APIs 34A.

In step 102, processor 38 receives, from a given client computer 46, a given API hub request 48. In embodiments of the present invention, the received API hub request comprises a request for a call to a given API endpoint 32 of a given API 34.

In step 104, processor 38 validates the received API hub request. In some embodiments, processor 38 can first identify the user metadata record corresponding to a given user referenced in the received request, and identify the API metadata record corresponding to the given API.

In a first validation embodiment, processor 38 can validate the received request by comparing parameters in the request to the parameter information for the given API to make sure that any required parameters are included, and that the included parameters are in the correct format and have acceptable values. In a second validation embodiment, processor 38 can validate the received request by monitoring the volume of API calls 30 to the given endpoint of the given API and compare the volume to the rate limit information for the given API and to the endpoint limit for the given endpoint to ensure that the volume is within the respective limits. In a third validation embodiment, processor 38 can validate the received request by ensuring that the subscription IDs for the given user includes the given API. In a fourth validation embodiment, processor 38 can validate the received request by comparing the given API in the received request to the API IDs in the API metadata records and detecting a match.

In step 106, if processor 38 determines that the received API hub request is valid, than in step 108 the processor uses embodiments described supra to generate a given API call 30 in response to the request. When generating the given API call, processor 38 can determine if the given API (i.e., comprising the given API call) is either public or private.

In step 110, if the given API is a given public API 34B, then in step 112, processor 38 conveys, to API public hub server 26, the generated API call in API call 30B, and the API public hub forwards API call 30B to a given server 28B in API call 30C. On the other hand, if the given API is a given private API 34A, then in step 114, processor 38 conveys, to a given server 28A referenced by the URL in the generated API call, the generated API call in API call 30A.

In step 116, processor 38 receives, in response to the conveyed API call, a given API response 36. If the given API is a given private API 34A, then processor 38 receives the API response in a given API response 36A from the given server 28A that processed the given private API call. However, if the given API is a given public API 34B, then the given web service server processes API call 30C, and conveys API response 36B to public API hub server 26, which conveys API response 36B to private API hub server 22 in API response 36C. Upon receiving API response 36C, processor 38 forwards the received response in API hub response 50 in step 118.

In step 120, processor 38 computes performance metrics for the conveyed API call (and the received API response). Examples of performance metrics that processor 38 can compute are described supra.

Finally, in step 122, processor 38 conveys the computed performance metrics to public API hub server 26, and the method continues with step 102. Returning to step 106, if processor 38 determines that the received API hub request is not valid then in step 124, the processor conveys a notification to the given client computer, and the method continues with step 102.

In the first request processing embodiment, a given client computer 46 can convey, to private API hub 22, requests for the following information:
- Usage and performance metrics 84 for private APIs 34A.
- Usage and performance metrics 84 for all API calls 30B to API public APIs 34B (i.e., the public API calls conveyed by private API hub server 22 and the public API calls from computing devices outside computing facility 20).
- Usage and performance metrics 84 for all API calls 30B conveyed by private API hub server 22 to API public APIs 34B.

Upon receiving the information request, processor 38 can forward the information request to public API hub 26, and upon receiving a response to the information request, the processor can forward the response to the given client computer.

Figure 5:
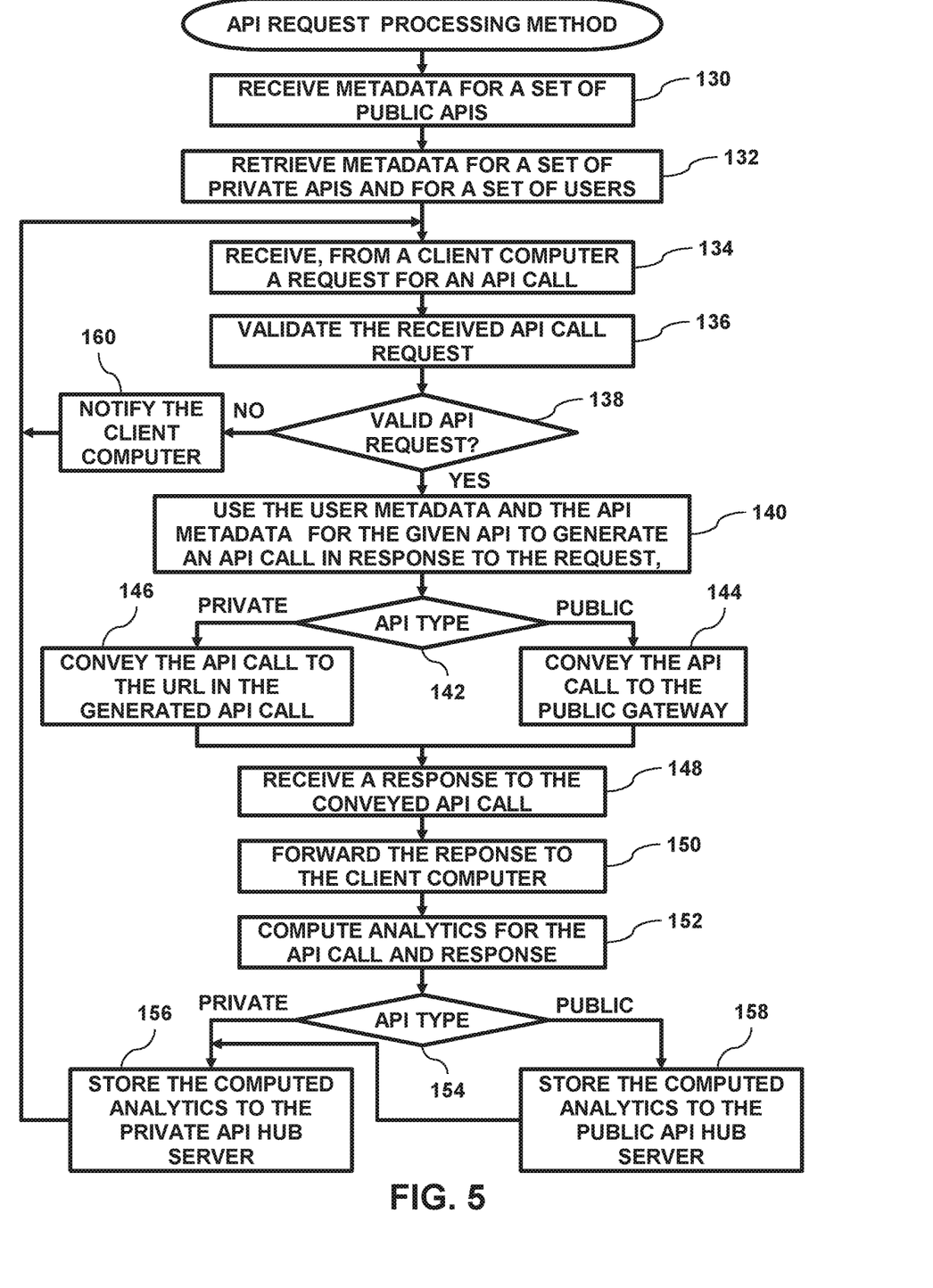
FIG. 5 is a flow diagram that schematically illustrates a first method for processing, by the private API hub server, requests for API calls to public and private APIs, in accordance with a second embodiment of the present invention.

FIG. 5 is a flow diagram that schematically illustrates a method for processing API hub requests 48, in accordance with a second request processing embodiment of the present invention. In step 130, processor 38 receives metadata 54 from public API hub server 26. In some embodiments, public API server 26 can convey metadata 54 to private API hub server 22 upon receiving metadata request 52 from the private API hub.

Upon receiving metadata 54, processor 38 populates API metadata records 42 with the information from API metadata 54. In the second request processing embodiment, processor 38 can receive the API metadata for a subset of "whitelisted" (i.e. for client computers 46) public APIs 34B managed by public API hub server 26.

In step 132, processor 38 loads API metadata 54 for private APIs 34A, populates API metadata records 42 with the private API metadata, loads user metadata 56, and populates user metadata records 44 with the user metadata. In the second request processing embodiment, processor 38 loads API metadata 54 for private APIs 34A and user metadata 56 from a local source in computing facility 20. In one embodiment, processor 38 can perform step 132 by receiving API metadata 54 for private APIs 34A and user metadata 56 from a given client computer 46. In another embodiment, or the processor can retrieve API metadata 54 for private APIs 34A and user metadata 56 from a storage device (not shown) coupled to private API hub server 22.

In step 134, processor 38 receives, from a given client computer 46, a given API hub request 48. As described supra, the received API hub request comprises a request for a call to a given API endpoint 32 of a given API 34.

In step 136, the processor validates the received API hub request in step 136. Embodiments for validating the received API request are described in the description referencing FIG. 4 hereinabove.

In step 138, if processor 38 determines that the received API hub request is valid, than in step 140 the processor uses embodiments described supra to generate a given API call 30 in response to the request. When generating the given API call, processor 38 can determine if the given API (i.e., comprising the given API call) is either public or private.

In step 142, if the given API is a given public API 34B, then in step 144, processor 38 conveys, to API public hub server 26, the generated API call in API call 30B, and the API public hub forwards API call 30B to a given server 28B in API call 30C. On the other hand, if the given API is a given private API 34A, then in step 146, processor 38 conveys, to a given server 28A referenced by the URL in the generated API call, the generated API call in API call 30A.

In step 148, processor 38 receives, in response to the conveyed API call, a given API response 36. If the given API is a given private API 34A, then processor 38 receives the API response as a given API response 36A from the given server 28A that processed the given private API call. However, if the given API is a given public API 34B, then the given web service server processes API call 30C, and conveys API response 36B to public API hub server 26, which conveys API response 36B to private API hub server 22 in API response 36C. Upon receiving API response 36C in step 150, processor 38 forwards the received response in API hub response 50.

In step 152, processor 38 computes performance metrics for the conveyed API call (and the received API response). Examples of performance metrics that processor 38 can compute are described supra.

In step 154, if the given API is a given private API 34A, then in step 156, processor 38 stores the computed performance metrics to usage and performance metrics 84 in the API metadata record corresponding to the given API, and the method continues with step 134. However, if the given API is a given public API 34B, then in step 158, processor 38 conveys the computed performance metrics to public API hub server 26, and the method continues with step 156.

Returning to step 138, if processor 38 determines that the received API hub request is not valid then in step 160, the processor conveys a notification to the given client computer, and the method continues with step 134.

In the second request processing embodiment, a given client computer 46 can convey requests to private API hub server 22 for the following information:
  Usage and performance metrics 84 for private APIs 34A.
  Usage and performance metrics 84 for all API calls 30B to API public APIs 34B (i.e., the public API calls conveyed by private API hub server 22 and the public API calls from computing devices outside computing facility 20).
  Usage and performance metrics 84 for all API calls 30B conveyed by private API hub server 22 to API public APIs 34B.

Upon receiving the information request, processor 38 can retrieve the requested information from API metadata records 42, and then forward the requested information to the given client computer.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
receiving, by a first application program interface (API) hub server in communication with a set of private APIs and with a second API hub server that is in communication with a set of public APIs, metadata for the public APIs and the private APIs, each of the public APIs and the private APIs comprising one or more respective API calls;
receiving, from a client computer, a request to access an endpoint of a given API;
generating, using the metadata for the given API, an API call;
upon determining that the given API comprises a given private API, conveying the generated API call to the given private API;
upon determining that the given API comprises a given public API, conveying the generated API call to the second API hub server; and
upon receiving a response to the conveyed generated API call, forwarding the response to the client computer.
2. The method according to claim 1, and comprising computing, by the first API hub server, performance metrics for the generated API call and the response.
3. The method according to claim 2, and comprising conveying the computed performance metrics to the second API hub server.
4. The method according to claim 3, and comprising receiving, by the first API hub server from the client computer, a request for performance metrics for one or more of the public APIs, forwarding the request to the second API hub server, receiving a response to the request for the performance metrics, and forwarding, to the client computer, the response to the request for the performance metrics.
5. The method according to claim 2, wherein the first API hub server stores, in a memory, initial performance metrics, and comprising updating, in the memory, the initial performance metrics with the computed performance metrics.
6. The method according to claim 5, and comprising conveying the computed performance metrics to the second API hub server upon determining that the given API comprises the given public API.
7. The method according to claim 5, and comprising receiving, by the first API hub server from the client computer, a request for performance metrics for one or more of the private APIs or one or more of the public APIs, retrieving the requested performance metrics from the memory, and forwarding, to the client computer, the retrieved requested performance metrics.
8. The method according to claim 2, wherein a given performance metric for the given API comprises usage information for the given API.
9. The method according to claim 1, wherein receiving the metadata for the public APIs and the private APIs comprises receiving the metadata for a subset of the public APIs.
10. An apparatus comprising a first application program interface (API) hub server in communication with a set of private APIs and with a second API hub server that is in communication with a set of public APIs, the first API hub server comprising:
a memory; and
at least one processor configured:
  to receive metadata for the public APIs and the private APIs, each of the public APIs and the private APIs comprising one or more respective API calls,
  to store the received API metadata to the memory, to receive, from a client computer, a request to access an endpoint of a given API, to generate, using the metadata for the given API, an API call, upon determining that the given API comprises a given private API, to convey the generated API call to the given private API, upon determining that the given API comprises a given public API, to convey the generated API call to the second API hub server, and upon receiving a response to the conveyed generated API call, to forward the response to the client computer.

11. The apparatus according to claim 10, wherein the at least one processor is further configured to compute performance metrics for the generated API call and the response.

12. The apparatus according to claim 11, wherein the at least one processor is further configured to convey the computed performance metrics to the second API hub server.

13. The apparatus according to claim 12, wherein the at least one processor is further configured to receive, from the client computer, a request for performance metrics for one or more of the public APIs, to forward the request to the second API hub server, to receive a response to the request for the performance metrics, and to forward, to the client computer, the response to the request for the performance metrics.

14. The apparatus according to claim 11, wherein the at least one processor is configured to store, in the memory, initial performance metrics, and wherein the at least one processor is further configured to update, in the memory, the initial performance metrics with the computed performance metrics.

15. The apparatus according to claim 14, wherein the at least one processor is further configured to convey the computed performance metrics to the second API hub server upon determining that the given API comprises the given public API.

16. The apparatus according to claim 14, wherein the at least one processor is further configured to receive, from the client computer, a request for performance metrics for one or more of the private APIs or one or more of the public APIs, to retrieve the requested performance metrics from the memory, and to forward, to the client computer, the retrieved requested performance metrics.

17. The apparatus according to claim 11, wherein a given performance metric for the given API comprises usage information for the given API.

18. The apparatus according to claim 10, wherein the at least one processor is configured to receive the metadata for the public APIs and the private APIs by receiving the metadata for a subset of the public APIs.

19. A computer software product, the product comprising a non-transitory computer-readable medium, in which program instructions are stored, which instructions, when read by a first application program interface (API) hub server in communication with a set of private APIs and with a second API hub server that is in communication with a set of public APIs, cause the first API hub server:

to receive metadata for the public APIs and the private APIs, each of the public APIs and the private APIs comprising one or more respective API calls;

to receive, from a client computer, a request to access an endpoint of a given API;

to generate, using the metadata for the given API, an API call;

upon determining that the given API comprises a given private API, to convey the generated API call to the given private API;

upon determining that the given API comprises a given public API, to convey the generated API call to the second API hub server; and upon receiving a response to the conveyed generated API call, to forward the response to the client computer.

\* \* \* \* \*